United States Patent
Crandall (10) Patent No.: US 11,209,554 B2
(45) Date of Patent: Dec. 28, 2021

(54) ENHANCED LORAN (ELORAN) SYSTEM HAVING MULTIPLE TRANSMIT FREQUENCIES

(71) Applicant: EAGLE TECHNOLOGY, LLC, Melbourne, FL (US)

(72) Inventor: Daniel W. Crandall, Merritt Island, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 0 days.

(21) Appl. No.: 16/851,228

(22) Filed: Apr. 17, 2020

(65) Prior Publication Data

US 2021/0325549 A1    Oct. 21, 2021

(51) Int. Cl.
*H04W 24/00* (2009.01)
*G01S 19/46* (2010.01)
*G01S 1/24* (2006.01)

(52) U.S. Cl.
CPC .............. *G01S 19/46* (2013.01); *G01S 1/245* (2013.01)

(58) Field of Classification Search
CPC ..... H04W 64/00; H04W 12/02; H04W 12/04; H04W 4/02; H04W 4/024; H04W 4/029; H04W 56/0015
USPC ............................................... 455/456.1, 265
See application file for complete search history.

(56) References Cited

U.S. PATENT DOCUMENTS

| | | | |
|---|---|---|---|
| 2,728,909 A | 12/1955 | Palmer | |
| 3,209,356 A | 9/1965 | Smith | |
| 3,242,492 A | 3/1966 | Honore et al. | |
| 5,181,041 A * | 1/1993 | Lind | G01S 5/12 342/389 |
| 7,388,541 B1 * | 6/2008 | Yang | G01C 21/206 342/464 |
| 8,063,825 B1 * | 11/2011 | Yang | G01S 5/009 342/458 |
| 9,948,452 B1 * | 4/2018 | Pearson | G01S 19/42 |
| 2010/0220008 A1 * | 9/2010 | Conover | G01S 1/245 342/357.29 |
| 2017/0160370 A1 * | 6/2017 | Yakubisin | G01S 1/245 |
| 2017/0192102 A1 * | 7/2017 | Wietfeldt | G01S 5/10 |
| 2018/0266887 A1 * | 9/2018 | Frank | G03B 15/006 |
| 2018/0356529 A1 * | 12/2018 | Lee | G01S 1/04 |
| 2020/0204283 A1 * | 6/2020 | Mason | H04J 3/245 |

(Continued)

OTHER PUBLICATIONS

K.A. Norton; "The Propagation of Radio Waves Over the Surface of the Earth and in the Upper Atmosphere, Part II;" Proceedings of the Institute of Radio Engineers, vol. 25, No. 9; 1937, pp. 1203-1236.

(Continued)

*Primary Examiner* — Joseph Arevalo (74) *Attorney, Agent, or Firm* — Allen, Dyer, Doppelt + Gilchrist, P.A. Attorneys at Law (57) ABSTRACT

An enhanced LOng RAnge Navigation (eLORAN) system may include a plurality of eLORAN transmitter stations, each configured to transmit respective eLORAN signals at different frequencies. An eLORAN receiver device may be configured to receive the respective eLORAN signals at different frequencies from each of the eLORAN transmitter stations, determine a correction factor based upon the received respective eLORAN signals, and apply the correction factor to determine a geographical position of the eLORAN receiver device.

23 Claims, 6 Drawing Sheets

(56) References Cited

U.S. PATENT DOCUMENTS

| | | | |
|---|---|---|---|
| 2020/0271746 A1* | 8/2020 | Mason | G01S 1/245 |
| 2020/0326419 A1* | 10/2020 | Parsche | H04L 27/2082 |
| 2020/0383076 A1* | 12/2020 | Kim | H04W 56/0015 |

OTHER PUBLICATIONS

G. Millington; "Ground-Wave Propagation Over an Inhomogeneous Smooth Earth;" Paper No. 794, Radio Section, 621.396.11; 1948, pp. 53-64.

G. Millington; "Ground-Wave Propagation Over an Inhomogeneous Smooth Earth Part 2. Experimental Evidence and Practical Implications;" The Proceedings of The Institution of Electrical Engineers, Ed. W.K. Brasher, vol. 97, Part III (Radio and Communication Engineering, No. 48; Paper No. 909, Radio Section, 621.396.11; 1950, pp. 209-217.

B. G. Pressey et al.; "The Measurement of the Phase Velocity of Ground-Wave Propagation at Low Frequencies Over the Land Path;" Paper No. 1438, Radio Section, 621.396.11:621.317.373. 029.5; 1952, pp. 73-84.

J. R. Johler et al.; "Phase of the Low Radiofrequency Ground Wave;" National Bureau of Standards Circular 573; United States Department of Commerce; 1956, pp. 1-38.

J. R. Wait; "Mixed Path Ground Wave Propagation: 1. Short Distances;" Journal of Research of the National Bureau of Standards, vol. 57, No. 1, Research Paper 2687; 1956, pp. 1-15.

J. R. Wait et al.; Mixed-Path Ground-Wave Propagation: 2. Larger Distances; Journal of Research of the National Bureau of Standards, vol. 59, No. 1, Research Paper 2770; 1957, pp. 19-26.

J. R. Wait; "Radio Wave Propagation in an Inhomogeneous Atmosphere;" National Bureau of Standards Technical Note, No. 24, Boulder Laboratories, U.S Department of Commerce, National Bureau of Standards; 1959, pp. 1-20.

J. R. Wait; "On the Theory of Mixed-Path Ground-Wave Propagation on a Spherical Earth;" Journal of Research of the National Bureau of Standards—D, Radio Propagation, vol. 65D, No. 4; 1961, pp. 401-415.

J. R. Johler; "Propagation of the Low-Frequency Radio Signal;" Proceedings of the IRE, National Bureau of Standards; 1962, pp. 404-427.

J. R. Wait; "Oblique Propagation of Groundwaves Across a Coastline—Part I;" Journal of Research of the National Bureau of Standards—D, Radio Propagation, vol. 67D, No. 6; 1963, pp. 617-624.

J. R. Wait et al.; "Oblique Propagation of Groundwaves Across a Coastline—Part II;" Journal of Research of the National Bureau of Standards—D, Radio Propagation, vol. 67D, No. 6; 1963, pp. 625-630.

K. Furutsu et al.; "Some Numerical Results Based on the Theory of Radio Wave Propagation Over Inhomogeneous Earth;" Radio Science Journal of Research NBS/USNC-URSI vol. 68D, No. 7; 1964, pp. 827-846.

K. Furutsu; "Calculated Curves for Groundwave Propagation Over Inhomogeneous Earth With Pronounced Topographical Features;" Radio Science Journal of Research NBS/USNC-URSI vol. 69D, No. 7; 1965, pp. 1011-1025.

"LORAN-C & LORAN-D Systems of Radionavigation;" USCG Electronics Engineering Center, Wildwood, New Jersey 1972, 27 pages.

A. Blomquist; "Seasonal Effects on Ground-Wave Propagation in Cold Regions;" Journal of Glaciology, Vol. 15, No. 73; 1975, pp. 285-303.

B. Gambill et al.; "LORAN-C Signal Analysis Propagation Model Evaluation;" Final Report No. CG-D-20-80 for DOT, US Coast Guard; 1970, 231 pages.

Z. Wu et al.; "Numerical Solutions of Integral Equation for Ground-to-Ground Radiowave Propagation;" 1991 Seventh International Conference on Antennas and Propagation, ICAP 91 (IEE), York, vol. 2; 1979, pp. 828-831.

L. M. DePalma et al.: "Development of LORAN-C Data Collection and Analysis Procedures;" Analytic Sciences Corporation, Final Report No. FAA-RD-80-48 for DOT, Federal Aviation Administration; 1980, 179 pages.

J. D. McNeill et al.; "Electrical Conductivity of Soils and Rocks;" Geonics Ltd., Technical Note TN-5; 1980, 20 pages.

D. Wells et al.; "LORAN-C Phaselag Investigation;" Department of Surveying Engineering, University of New Brunswick, CA; Technical Report No. 96; Mar. 1983; 110 pages.

Bernard Ambroseno, Editor; "Phase Lags of 100 kHz Radiofrequency Ground Wave and Approximate Formulas for Computation, (Brunavs);" Wild Goose Association Radionavigation Journal, published by the Wild Goose Association, 1984, 92 pages.

"The Phase of The Ground Wave, (Question 1/5)" International Telecommunication Union (ITU), Report 716-3, 1990, pp. 91-94.

"Loran-C User Handbook;" USCG Commandant Publication P16562. 5, 1991, 160 pages.

"Ground-Wave Propagation Curves for Frequencies Between 10 kHz and 30 Mhz;" International Telecommunication Union (ITU), ITU-R p. 368-9, 2007, pp. 1-54.

Basker et al.; "Enhanced Loran (eLoran) Definition Document;" International Loran Association, Report Version 1.0, 2007, 17 pages.

S. Lo et al.; "Defining Primary, Secondary, Additional Secondary Factors for RTCM Minimum Performance Specifications (MPS);" Stanford University, 2009, 9 pages.

Ml. Kizlo et al.; "The Causes of the Parameters Changes of Soil Resistivity;" doi:10.2478/v10144-009-0009-z, Scientific Journal of Riga Technical University—Power and Electrical Engineering, vol. 25, 2009, pp. 43-46.

Z. M. Crane; "Short Distance Ground Wave Propagation Modeling in Irregular and Forested Environments;" Master's Thesis, Master of Science, University of Tennessee, Knoxville, 2011, 71 pages.

W. Bai et al.; "Effects of Physical Properties on the Electrical Conductivity of Compacted Lateritic Soil;" Journal of Rock Mechanics and Geotechnical Engineering, vol. 5, Issue 5, 2013, pp. 406-411.

D. Cavka et al.; "A Comparison of Frequency-Dependent Soil Models: Application to the Analysis of Grounding Systems;" doi: 10.1109/TEMC.2013.2271913, IEEE Transactions on Electromagnetic Compatibility, vol. 56, No. 1, 2014, pp. 177-187.

"Handbook on Ground Wave Propagation;" Handbooks on Radiocommunications, ITU, Geneva, http://handle.itu.int/11.1002/pub/809efe7d-en, 2014, 66 pages.

"World Atlas of Ground Conductivities;" ITU-R Radiocommunications Sector of ITU, Recommendation p. 832-4, 2015, 51 pages.

"Electrical Characteristics of the Surface of the Earth;" ITU-R Radiocommunications Sector of ITU, Recommendation ITU-R p. 527-4, 2017, 21 pages.

F. Jones; "Geophysics foundations: Physical properties: Electrical resistivity of geologic materials;" UBC Earth and Ocean Sciences, 2007, 11 pages.

M. Mitalo et al.; "Effects of High Fault Currents on Ground Grid Design;" doi: 10.1109/TIA.2010.2046297, IEEE Transactions on Industry Applications, vol. 46, No. 3, 2010, pp. 1118-1124.

Basker et al., "Enhanced Loran (eLoran) Definition Document", International Loran Association, Jan. 2007, pp. 1-17.

* cited by examiner

ENHANCED LORAN (ELORAN) SYSTEM HAVING MULTIPLE TRANSMIT FREQUENCIES

FIELD OF THE INVENTION

The present invention relates to the field of navigation and, more particularly, to the enhanced LOng RAnge Navigation (eLORAN) system and related methods.

BACKGROUND OF THE INVENTION

The LOng RAnge Navigation (LORAN) system was developed in the United States during World War II. Subsequent implementations provided for enhancements in accuracy and usefulness, including LORAN-C and later enhanced LORAN (eLORAN) implementations. The eLORAN system is a low frequency radio navigation system that operates in the frequency band of 90 to 110 KHz and includes transmissions that propagate by ground wave. The eLORAN system transmits LORAN type navigation RF pulses at a center frequency of about 100 KHz and differs from LORAN-C in that eLORAN transmissions are synchronized to the UTC similar to GPS, and include time-of-transmission control, differential corrections similar to differential GPS, the use of "all-in-view" tracking, and one or more eLORAN data channels that provide low-rate data messaging, differential corrections, and almanac information.

With the rise of satellite-based navigation systems such as Global Positioning System (GPS), there has been relatively little development or investment in terrestrial-based navigation systems, such as the eLORAN system, until recently. A renewed interest in such systems has arisen regarding eLoran as a backup to satellite based navigation and timing systems, particularly since low frequency eLORAN signals are less susceptible to jamming or spoofing compared to the relatively higher frequency and lower powered GPS signals.

In current eLORAN systems, each eLORAN receiver is preloaded with a set of fixed, additional secondary factor (ASF) maps. The ASF map values are measured correction factors for the theoretical time-of-flight of the transmitted pulses for the path from transmitter to receiver. These correction factors are due to humidity, soil conductivity, and other environmental conditions. There is usually one unique ASF map per eLORAN transmitter. The values in these fixed ASF maps are interpolated and extrapolated at an eLORAN receiver from one-time ASF measurements that were acquired using a mapping receivers in a coarse grid across a coverage area of interest. For example, an ASF mapping vehicle could travel along selected roads making a single pass, and thus, acquire the values for implementing the ASF Map, which are stored in each eLORAN receiver. In the conventional eLORAN systems, reference stations are provided to allow more accurate eLORAN positioning. Reference stations measure and distribute time-varying "local" ASF corrections that are valid in about a 35 kilometer radius coverage from the respective reference station. These "local" ASF corrections are transmitted in near real-time via the eLORAN data channel (LDC).

Reference stations provide the high accuracy time and position corrections to aid in accurate location of an eLORAN receiver to determine its geographical position. This is more important in the navigation systems for ships entering a harbor or planes approaching an airport. With the limitation of a 35 kilometer radius coverage from a reference station, the entire continental United States would require about 3,200 reference stations for 100%, best accuracy coverage. Even if each reference station required only a 100 kilometer radius effectivity, then the eLORAN system would still require about 250 reference stations to cover the continental United States.

Reference stations are expensive to build and maintain. In addition to the initial potential cost of building the 3,200 reference stations, there are deployment, overhead and management costs that occur after installation during the eLORAN system operation. The conventional eLORAN system also incorporates the LORAN data channel (LDC) for distribution of the differential corrections that are generated by the reference stations to the various eLORAN receiver devices. Although different LORAN data channel options are currently being investigated, none of the LORAN data channel options may be able to handle the volume of data generated by a large quantity of reference stations.

Therefore, there is a need for further developments in the eLORAN system to improve eLORAN system performance without the use of a prohibitively large number of reference stations. Although applying reference stations only in populated areas or major ports would help reduce the volume of data generated by the reference stations, and reduce the data capacity in the use of the LORAN data channel, accuracy in the eLORAN system would be compromised in this approach in those areas without reference stations.

SUMMARY OF THE INVENTION

In general, an enhanced LOng RAnge Navigation (eLORAN) system may include a plurality of eLORAN transmitter stations, each configured to transmit a respective plurality of eLORAN signals at different frequencies. An eLORAN receiver device may be configured to receive the respective plurality of eLORAN signals at different frequencies from each of the plurality of eLORAN transmitter stations, determine a correction factor based upon the received respective pluralities of eLORAN signals, and apply the correction factor to determine a time and/or geographical position of the eLORAN receiver device.

The eLORAN receiver device may be configured to determine the correction factor based upon a phase delay between the received respective pluralities of eLORAN signals. In an embodiment, each eLORAN transmitter station may be configured to transmit the respective plurality of eLORAN signals simultaneously. In another embodiment, each eLORAN transmitter station may be configured to transmit the respective plurality of eLORAN signals sequentially. In yet another embodiment, each eLORAN transmitter station may be configured to transmit the respective plurality of eLORAN signals sequentially based upon an eLORAN group repetition interval (GRI).

Each respective plurality of eLORAN signals may comprise a first eLORAN signal at a first frequency in a range between 90 KHz and 110 KHz, and a second eLORAN signal at a second frequency above 110 KHz. The second eLORAN signal may be in a range of 150 KHz to 350 KHz. The eLORAN receiver device may be configured to further receive additional secondary factor (ASF) data to determine the geographical position of the eLORAN receiver. The eLORAN receiver device may comprise an eLORAN receiver and an eLORAN receiver device controller coupled thereto. Each eLORAN transmitter station may comprise an eLORAN transmitter and an eLORAN transmitter station controller coupled thereto.

In another embodiment, an enhanced LOng RAnge Navigation (eLORAN) receiver device for an eLORAN system may include a plurality of eLORAN transmitter stations, each eLORAN transmitter station configured to transmit a respective plurality of eLORAN signals at different frequencies. The eLORAN receiver device may comprise an eLORAN receiver and an eLORAN receiver device controller coupled thereto and configured to receive the respective plurality of eLORAN signals at different frequencies from each of the plurality of eLORAN transmitter stations, determine a correction factor based upon the received respective pluralities of eLORAN signals, and apply the correction factor to determine a geographical position of the eLORAN receiver device.

In yet another embodiment, an enhanced LOng RAnge Navigation (eLORAN) transmitter device for an eLORAN system may include an eLORAN receiver device. The eLORAN transmitter device may comprise an eLORAN transmitter and an eLORAN transmitter station controller coupled thereto and configured to transmit a plurality of eLORAN signals at different frequencies so that the eLORAN receiver device receives the plurality of eLORAN signals at different frequencies, determines a correction factor based upon the received plurality of eLORAN signals, and applies the correction factor to determine a geographical position of the eLORAN receiver device.

Another aspect is directed to a method for determining a position of an enhanced LOng RAnge Navigation (eLORAN) receiver device. The method includes operating a plurality of eLORAN transmitter stations to transmit a respective plurality of eLORAN signals at different frequencies, and operating the eLORAN receiver device to receive the respective plurality of eLORAN signals at different frequencies from each of the plurality of eLORAN transmitter stations, determine a correction factor based upon the received respective pluralities of eLORAN signals, and apply the correction factor to determine a geographical position of the eLORAN receiver device.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION

The present description is made with reference to the accompanying drawings, in which exemplary embodiments are shown. However, many different embodiments may be used, and thus, the description should not be construed as limited to the particular embodiments set forth herein. Rather, these embodiments are provided so that this disclosure will be thorough and complete. Like numbers refer to like elements throughout, and prime notation is used to indicate similar elements in different embodiments.

Figure 1:
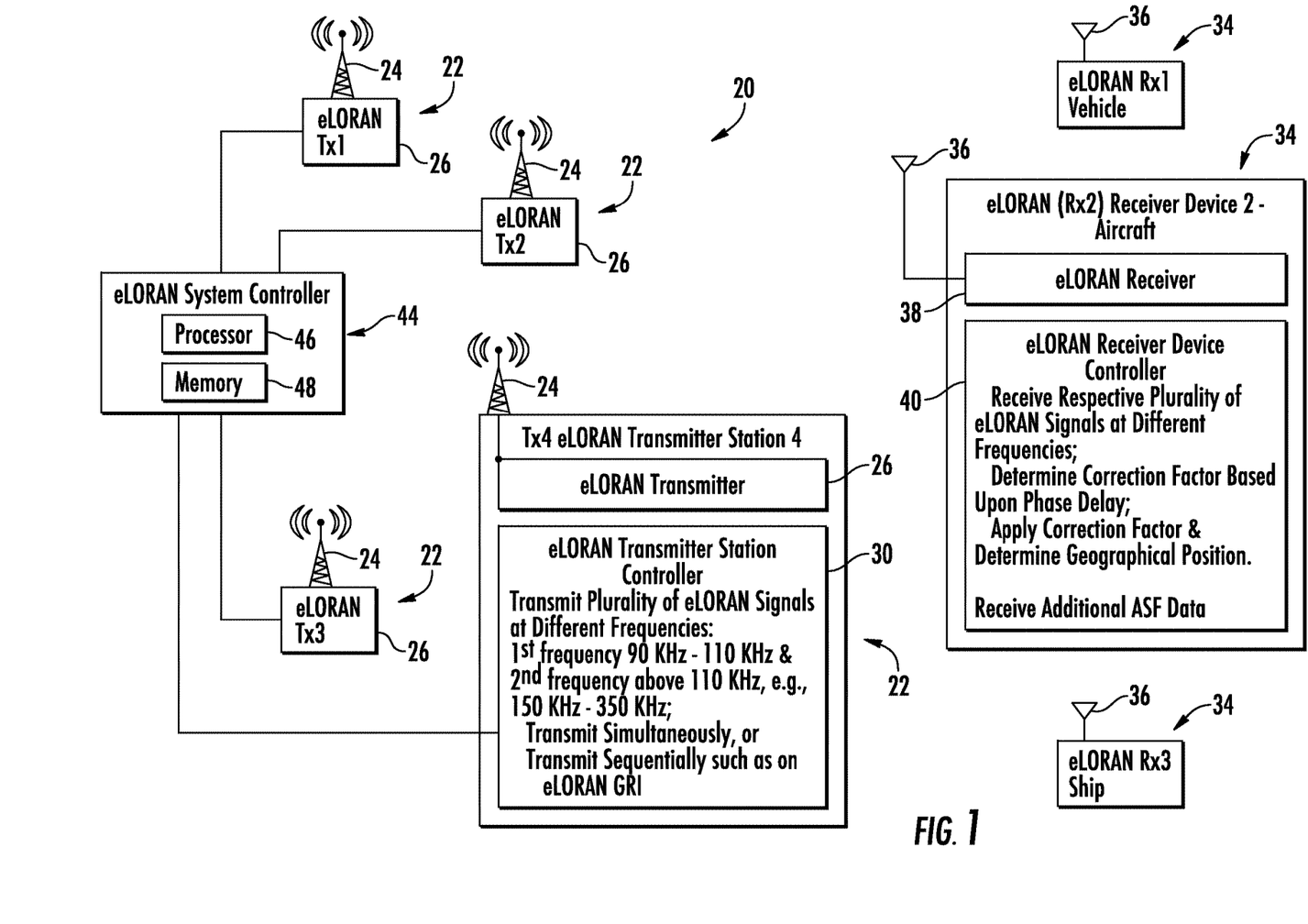
FIG. 1 is a schematic block diagram of an eLORAN system in accordance with an example embodiment.

Referring initially to FIG. 1, there is illustrated generally at 20 an enhanced LOng RAnge Navigation (eLORAN) system that includes a plurality of eLORAN transmitter stations indicated generally at 22, each formed as an eLORAN transmitter device, and each including an eLORAN transmitter antenna 24 and eLORAN transmitter 26 coupled to the eLORAN antenna and configured to transmit data over an eLORAN data channel (LDC) and transmit a series of eLORAN navigation pulses. Each eLORAN transmitter station 22 includes the eLORAN transmitter 26 that transmits a plurality of eLORAN signals, with one of the signals corresponding to eLORAN navigation RF pulses. Four eLORAN transmitter stations 22 are illustrated and labeled as TX1, TX2, TX3, and TX4. As shown in the example of the eLORAN transmitter station 22 labeled TX4, each eLORAN transmitter station includes a respective eLORAN transmitter station controller 30 coupled to the eLORAN transmitter 26 and configured to transmit the respective plurality of eLORAN signals at different frequencies that are received by users operating eLORAN receiver devices indicated generally at 34, and which could be located in a terrestrial land vehicle, aircraft, building or ship, and illustrated schematically with eLORAN Rx1 for a land mobile vehicle, and eLORAN receiver device 2 (eLORAN Rx2) for an aircraft, and eLORAN Rx3 for a ship.

As shown with the example of the aircraft, eLORAN (Rx2) receiver device 2, each eLORAN receiver device 34 includes an eLORAN receiver antenna 36 and an eLORAN receiver 38 coupled to the eLORAN receiver antenna. An eLORAN receiver device controller 40 is coupled to eLORAN receiver 38 and is configured to receive the respective plurality of eLORAN signals at different frequencies from each of the plurality of eLORAN transmitter stations 22, determine a correction factor based upon the received respective pluralities of eLORAN signals, and apply the correction factor to determine a geographical position of the eLORAN receiver device. This geographical position determination may include time, not just position. For the determination of time, a minimum of one transmitter 26 should be "in view" of a receiver. For the determination of position, a minimum of three transmitters 26 should be in view of a receiver. The eLORAN receiver device controller 40 is configured to determine the correction factor based on a phase delay between the received respective plurality of eLORAN signals. Each eLORAN transmitter station controller 30 and each eLORAN receiver device controller 40 may include a processor, memory and associated components (not illustrated) generally associated with the transmitters and receivers in a conventional eLORAN system.

Each of the eLORAN transmitter stations 22 may be operatively connected to an eLORAN control station operating as a system controller 44 that may include a processor 46 and memory 48 coupled thereto and configured to generate eLORAN data to each of the eLORAN transmitter stations 22 for transmission on the eLORAN data channel to the eLORAN receiver devices 34. The eLORAN receiver device controller 40 may also be configured to cooperate with the plurality of eLORAN transmitter stations 22 and based upon the transmitted eLORAN pulses determine a receiver clock error that may be corrected from additional secondary factor (ASF) data received at the eLORAN receiver device 34. This ASF data may be based upon different geographical positions in different times for each different geographical position. The eLORAN receiver device controller 40 stores any updated ASF data.

In the eLORAN system 20 as described, reference stations that are designed for use in conventional eLORAN systems may not be used. The current eLORAN system 20 uses the respective plurality of eLORAN signals that are transmitted at different frequencies from each of the eLORAN transmitter stations 22. The transmitted signals are received at an eLORAN receiver device 34 and a correction factor based upon the received respective pluralities of eLORAN signals is determined. The correction factor is applied to determine the geographical position of the eLORAN receiver device 34. As noted before, the eLORAN receiver device controller 40 is configured to determine the correction factor based upon a phase delay between the received respective pluralities of eLORAN signals, and in an example, two signals having spaced apart frequencies, such as the eLORAN signal frequency of 100 KHz and a 300 KHz signal.

Each eLORAN transmitter station controller 40 may be configured to transmit the respective plurality of eLORAN signals simultaneously or transmit the respective plurality of eLORAN signals sequentially. It is also possible to transmit the respective plurality of eLORAN signals sequentially based upon an eLORAN group repetition interval (GRI), as explained in greater detail below.

Figure 2:
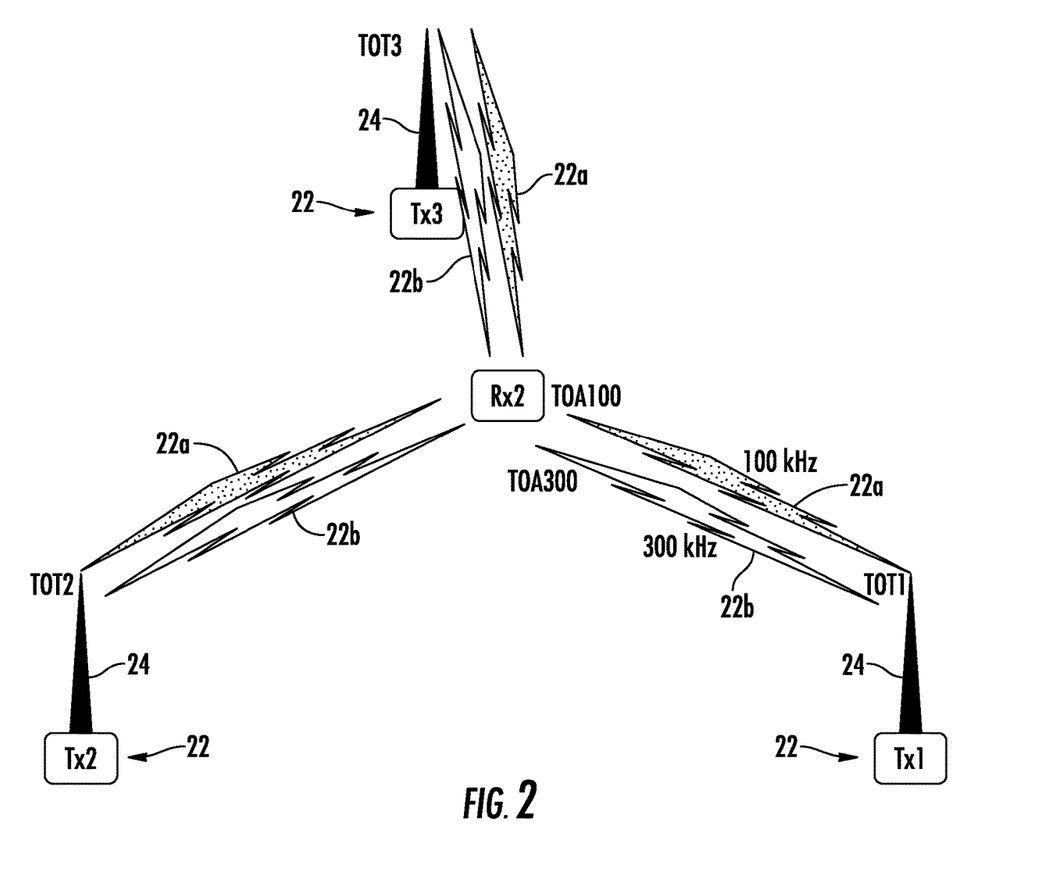
FIG. 2 is a schematic diagram showing an example of three eLORAN transmitter stations in the eLORAN system of FIG. 1 and each transmitting a respective plurality of signals.
Figure 3:
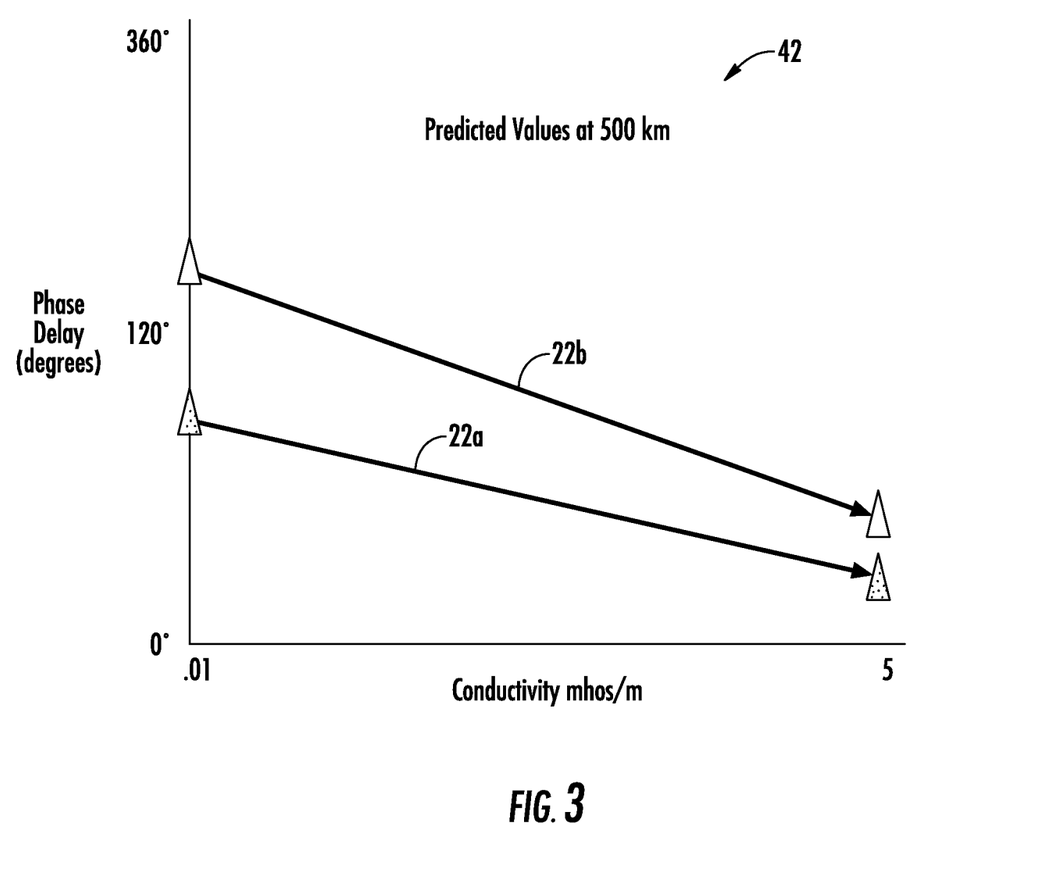
FIG. 3 is a graph showing phase delay versus conductivity for an eLORAN signal.

Referring now to FIG. 2, there are illustrated a schematic representation of three transmitter stations 22 that are each transmitting the plurality of eLORAN signals, which in this example includes a first eLORAN signal 22a at a first frequency in a range between 90 KHz and 110 KHz and a second eLORAN signal 22b at a second frequency above 110 KHz. This frequency of 110 KHz is a non-limiting example and it is possible that the frequency may be above or below 110 KHz. In this example, the frequency range of 90 KHz and 110 KHz for the first signal 22a corresponds to the frequency band used in conventional eLORAN systems. The second eLORAN signal 22b is at a frequency above 110 KHz and in an example is in the range of 150 KHz to 350 KHz, and in the example of FIG. 2, shows the two signals transmitted from each transmitter station 22, at respective 100 KHz and 300 KHz signals. It has been found that the phase of the 100 KHz signal 22a is not impacted as much by changing conductivity as compared to the phase of the 300 KHz signal 22b, which is more impacted by changing conductivity than the 100 KHz signal as shown in the graph 42 of FIG. 3, illustrating the phase delay in degrees versus the conductivity in mhos/m for the respective 100 KHz and 300 KHz signals and predicted values at 500 km. The eLORAN receiver device controller 40 measures and logs the change in the time of arrival (TOA) between each pair of signals 22a, 22b. The time of transmission (TOT) is known for each of the signals 22a, 22b. As the weather impacts soil temperature and moisture, it impacts the surface and a change in the delta for the time of arrival (TOA). This delta becomes smaller for higher soil moisture. The delta becomes larger for higher soil temperature and the net effect can be used to determine the correction factor based upon the received plurality of eLORAN signals, e.g., first and second signals 22a, 22b, and the correction factor applied to determine the geographical position of the eLORAN receiver device 34.

The eLORAN system 20 is a positioning, navigation and timing (PNT) service used for aviation, maritime and land-mobile vehicle navigation as well a fixed station timing for users. As a location and timing system, the eLORAN system 20 may complement the Global Navigation Satellite Systems (GNSS). The eLORAN transmissions are synchronized to an identifiable, publicly-certified source of coordinated universal time (UTC) independent of the GNSS, and thus, may operate independently of the GNSS. The eLORAN system 20 includes the additional eLORAN data channel (LDC) on the transmitted signal, thus distinguishing the eLORAN system from traditional LORAN-C systems. This eLORAN data channel transmits application-specific corrections, warnings and signal integrity information, including station specific eLORAN data, such as station identification. In a conventional eLORAN system, differential eLORAN corrections and non-station specific eLORAN data such as almanac information, including reference station latitude, reference station longitude, and a reference station correction list are transmitted. This reference station data is not required in the illustrated eLORAN system 20 since the reference stations are not used in the illustrated embodiment.

The eLORAN system 20 may include Primary Factor (PF) data, Secondary Factor (SF) data, and Additional Secondary Factors (ASF) data to allow optimum performance for eLORAN receiver devices 34. The primary factor (PF) data accounts for the time of propagation of the LORAN navigation RF pulses through the atmosphere based on the speed of light in atmosphere. The eLORAN system 20 provides a value of the speed of light in the atmosphere usually at about 161,829 nautical miles/second, which is equivalent to about 299,707,308 meters per second. These values can vary slightly depending on which value is used for speed of light and other related variables, such as values supplied by the United States Coast Guard. Alternative definitions may specify the primary factor as a difference in propagation time between a signal traversing through vacuum versus the atmosphere.

The secondary factor (SF) data accounts for the difference in propagation time for a LORAN navigation RF pulse originating from an eLORAN transmitter station 22 and propagating its signal over an all seawater path, rather than through the atmosphere in the absence of seawater path. The Additional Secondary Factor (ASF) data, on the other hand, is the extra delay based on the time-of-arrival (TOA) of the LORAN navigation RF pulses due to propagation over a non-homogenous, rough land path, such as elevated terrain, as opposed to over ocean water. This ASF delay can be significant and usually each eLORAN receiver device 34 makes a rough estimate based on the ASF data stored at the eLORAN receiver device to achieve accuracy in tens to hundreds of meters. The ASF data can vary spatially and temporarily, and thus, ASF grid and differential eLORAN corrections provided by reference stations in conventional eLORAN systems are used to account for the temporal and spatial variations. However, in the current eLORAN system 20, there are no differential eLORAN corrections that are established by eLORAN reference stations since eLORAN reference stations are not used to compensate for the lack of accuracy with standard ASF maps.

Usually a service provider publishes a table of values as a map with an ASF grid for a nominal ASF to improve the accuracy of eLORAN receiver devices 34. Each eLORAN receiver device 34 includes an ASF grid stored in its memory associated with the eLORAN receiver device controller 40, indicating the relative local variations of the ASF relative to the nominal value for the region, and may be provided at intervals that are in the order of hundreds of meters. The current eLORAN system 20 as described does not require the reference stations and instead determines a correction factor based upon the received respective pluralities of eLORAN signals transmitted from the eLORAN transmitter stations 22 and applies the correction factor determined at an eLORAN receiver device 34 to determine the geographical position.

As noted before, the plurality of eLORAN transmitter stations 22 transmit a plurality of eLORAN signals at different frequencies, and in an example, each transmitter station transmits two frequency signals 22a, 22b for the determination of changes in propagation delays of the ground waves caused by the changes in the conductivity and permittivity properties of the surface over which the waves are travelling through differentiation of propagation characteristics of the two frequencies. The difference in ground wave propagation delays of the two distinct signals 22a, 22b transmitted at two distinctly different frequencies, but transmitted from the same location, permits the analysis at the eLORAN receiver device 34 of the low frequency ground wave phase delay characteristics using the difference in phase delay change of a higher frequency compared to the phase delay change of a lower frequency and applies those differences to the calculation of differential corrections for the eLORAN system 20.

It is understood that transmitted RF signals in a ground wave or a surface wave are impacted by the properties of the terrain they pass over. These properties include elevated elements such as trees, hills, and buildings, and the soil properties such as conductivity and permittivity, which change with temperature and moisture, water body properties such as conductivity and permittivity, which change with temperature and salinity levels, and shorelines of water bodies to the earth interface. The frequency dependent conductivity properties impacted by soil and water are analyzed, e.g., the temperature of water and soil, the salinity of water, the moisture content of soil, and similar factors. An example of an initial study for these effects is explained in the article "Mixed-Path Ground-Wave Propagation: Part 2, Larger Distances" by Wait and Householder, Journal of Research of the National Bureau of Standards (1957).

Figure 4:
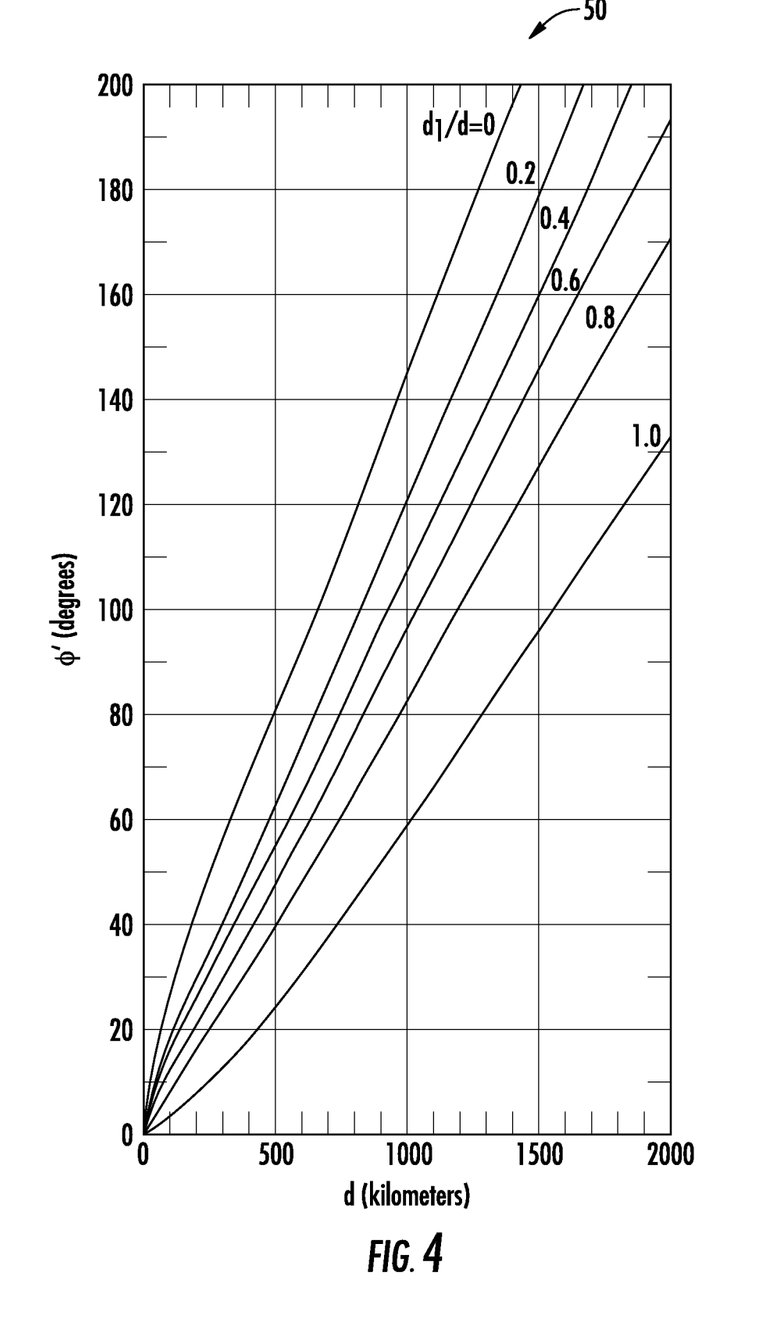
FIG. 4 is a graph showing phase changes with distance over sections of low conductivity at a first frequency of 100 KHz for a transmitted signal.
Figure 5:
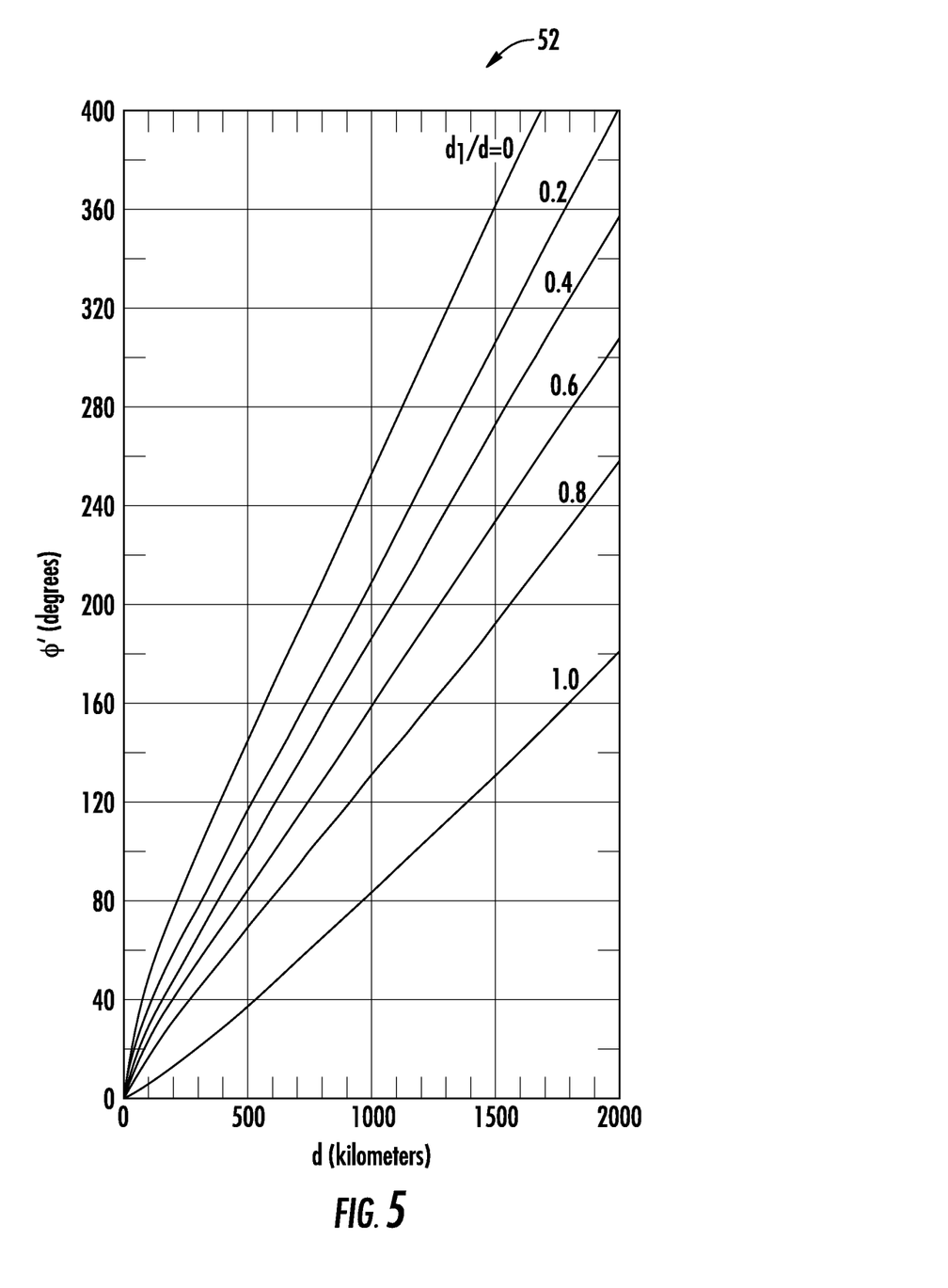
FIG. 5 is a graph similar to the graph of FIG. 4, but showing the phase changes for 200 KHz.

Referring now to the graphs 50,52 of FIGS. 4 and 5, which are taken from Wait and Householder, specific scenarios showing examples for the phase factor for mixed path propagation are illustrated with the phase factor in degrees on the vertical axis and distance in kilometers on the x axis, using 100 KHz (FIG. 4) and 200 KHz (FIG. 5) signals as examples. In this example of these graphs 50,52, d1/d is the ratio of distance over water versus over land and d1 is distance over water and d is distance over land. Referring to the graphs, d1/d=0 corresponds to when the signal is entirely over land, and d1/d=1 corresponds to when the signal is entirely over water. The conductivity over land as used in the calculation is equal to $10^{-2}$ mhos/m and the conductivity over water used in the calculation is equal to 4 mhos/m.

The following factors may be established as an example. A 36° phase delay is equal to about a 1 µs timing delay. Based upon the groups such as shown in the graphs 50,52 of FIGS. 4 and 5, it is evident that for the given conditions as correlated in the graphs, the phase delay of a 100 KHz signal over land at 500 km is about 80° (~2.2 µs or 667 m), (time-phase angle/360*f) (100 ns=30 m). The phase delay of a 200 KHz signal over land at 500 km is at about 140° and corresponds to about 38.9 µs. The phase delay of a 100 KHz signal over water at 500 km is about 25°, and the phase delay of a 200 KHz signal over water at 500 km is about 48°. For a 100 KHz signal, there is a phase delay difference of 55° at 500 km for a conductivity value difference of 3.9 mhos/m. For a 200 KHz signal, there is a phase delay difference of 92° at 500 km for a conductivity value difference of 3.9 mhos/m. For the same $10^{-2}$ mhos/m over land, there is a phase delay difference between 100 KHz and 200 KHz at 500 km of 60°. For the same 4 mhos/m over water, there is a phase delay difference between 100 KHz and 200 KHz at 500 km of 23°. There is a faster phase delay at 200 KHz with decreasing conductivity than at 100 KHz and the delta may be used. As conductivity increases, the phase delay decreases (the phase velocity increases), and as frequency increases, phase delay increases.

When the eLORAN system 20 is used for positioning, a minimum of three eLoran transmitter stations 22 may be used to calculate a two-dimensional position fix and time. Time (phase) and frequency can be derived from a single transmitter station 22. With three sites, position can be derived while an eLORAN receiver device 34 is stationary or in motion. To achieve the highest accuracy levels in a conventional eLORAN system, a conventional eLORAN receiver device corrects its TOA measurements with the published ASF values for the area and uses the differential eLORAN corrections determined using the reference stations and the differential correction data received through the LORAN data channel.

The eLORAN system 20 as described above, however, may not use any reference stations. ASF maps for specific geographic areas may be distributed to users in an eLORAN receiver device 34 independent data format. The measured ASF values remain stable over long periods of time. Any small changes in the published ASFs due to changes in propagation path characteristics or transmitter-related delays will be compensated for in the conventional eLORAN systems by differential corrections, and in the current eLORAN system 20 described above by determining the correction factor based upon the phase delay between the received respective plurality of eLORAN signals. In a conventional eLORAN system, on the other hand, the reference station compares its measured ASFs against the published values and broadcasts corrections to the users through the LORAN data channel.

These results and observations flow from the work of Wait and Householder, which concluded that:

$$W' = W + 2\left(\frac{\rho_0}{\pi}\right)^{1/2}\left[\frac{1-k^{1/2}}{k^{1/2}}\right]e^{-i\frac{\pi}{2}}\int_0^{d_1^{1/2}} \frac{W(d-x^2, \eta, \alpha)W(x^2, \eta_1, \alpha)dx}{\sqrt{d-x^2}},$$

$$\text{where } k = \frac{\sigma_1 + i\omega_{e_1}}{\sigma + i\omega_e} \text{ and } \rho_0 = -\frac{i\beta d}{2}\left(\frac{\eta}{120\pi}\right)^2.$$

The phase lag is defined by:

$\phi'(\text{i.e.},\phi'=\arg W')$

The eLORAN system 20 as described uses the two signal frequencies 22a, 22b for the various conductivity versus phase delay changes. The two signal frequencies 22a, 22b could be the 100 KHz and 300 KHz signals as non-limiting examples. The 300 KHz frequency signal 22b may be available as DGPS phases out over the next few years.

The ELORAN receiver device 34 is able to detect the variation in phase delay between the two signal frequencies 22a, 22b based on diurnal and seasonal changes in surface properties and calculate the differential correction for the 100 KHz eLORAN signal for use in Time Of Arrival corrections. This can provide accuracies similar or better than conventional eLORAN systems that use reference stations. The phase determination accuracy within a conventional eLORAN receiver device historically has been about 1% of the wavelength, e.g., about 30 meters. With the current eLORAN receiver design 34, the accuracy may be improved.

The graphs 50,52 in FIGS. 4 and 5 illustrate the 100 KHz and 200 KHz examples, but the delta variation is greater at 300 KHz as shown in the graph of FIG. 3 with the 100 KHz and 300 KHz signal 22a, 22b examples. The eLORAN receiver device 34 receives a set of pulses at 100 KHz and provides a relative time stamp based on a standard zero crossing. The eLORAN receiver device controller 40 decodes the LDC UTC word for that set of pulses. The eLORAN receiver device controller 40 calculates a relative time delay for that set of pulses based on the local time clock versus the UTC time stamp. This process is repeated for a set of pulses 22b at 300 KHz that is transmitted immediately (within a minute) after the set of 100 KHz pulses. The two sets of pulses 22a, 22b may be received within a maximum of 99.99 ms of each other based upon maximum GRI, which is a value to be determined. Diurnal changes occur at a much slower rate, thus allowing the use of near-simultaneous transmissions versus simultaneous transmissions. Temporal changes occur at a slower rate than diurnal changes. The eLORAN receiver device controller 40 calculates the difference in phase delay between the two signals 22a, 22b at two distinctly different frequencies and records it. This process is repeated at timely intervals, e.g., every two minutes. As the conductivity of the path changes, so will the difference in phase delays between the two received signal frequencies 22a, 22b.

As a non-limiting example, it is possible to use data from the plots of the graphs of FIGS. 4 and 5 and extrapolate for a distance of 1000 km. The eLORAN receiver device 34 may be stationary in this example, and the distance from TX to RX is 1000 km. The path has a ratio of 0.4 water to land. Based on an ASF map, land conductivity is $10^{-2}$ mhos/m and water conductivity is 4 mhos/m. The phase factor at 100 KHz is 110° for a delay of 3.06 µs, and the phase factor at 200 KHz is 215° for a delay of 5.97 µs. The difference between the two is 2.84 µs and this value may be used as the baseline. In the process, conductivity has changed. To use the plots, a different water/land path ratio may be chosen, effectively changing the combined average conductivity of the path. Using the path ratio 0.8, more signal path is provided over better conducting sea water, and the phase factor at 100 KHz is 82° for a delay of 2.28 µs and the phase factor at 200 KHz is 130° for a delay of 3.61 µs. The difference between the two is 1.33 µs. It is not always possible to know how accurate the local clock, i.e., the eLORAN receiver device 34 clock is to UTC, but that does not matter for a relative difference in TOA (Time of Arrival). The average conductivity of the signal path has changed to cause a reduction in propagation delay, e.g., for 100 KHz, 3.06-2.28=0.78 µs, and for 200 KHz, 5.97-3.61=2.36 µs. The time difference is calculated and correct time is established using the change in TOA.

As a result, the phase delay as the propagation delay of RF signals has a ground conductivity term and a frequency term. Two signals transmitted at two different frequencies will travel at different velocities. If the Time Of Transmission of each signal is known by all, then neighboring transmitter stations 22 equipped with receivers will be able to calculate the delay in signal propagation of its neighboring transmitter station. The stability of this phase makes possible the precision radio navigation systems such as older Decca and Loran-C. Conversely, the precision with which the phase of the ground wave is measured by these navigation systems makes possible precise experimental verification of ground-wave propagation theories.

As noted before, ASF maps can be frequently updated and data redistributed via a wireless data channel or the eLORAN data channel, including use of WiFi, Bluetooth, cellular, USB and other communication systems for greater accuracy. Conventional eLORAN systems may use a single ASF map such as provided by the United States Coast Guard. This one time single ASF map may be published as a text document and provided to receiver manufacturers as a one-time load into memory.

There now follows further description for the general operation of the eLORAN system 20 described above. Common messages are transmitted from the eLORAN transmitter stations 22 and may include encryption keys to encrypt messages. These keys are typically changed frequently. In eLORAN systems 20, the keys may be changed daily. The keys may be changed even for different messages. Common messages may also include eLORAN receiver control messages, broadcast messages and almanac information. Other data in the common messages may include station identification data and the UTC time. Because there are no reference stations, differential corrections are not included and there is no need to transmit almanac information that includes reference station latitude, reference station longitude, and reference station correction lists.

The eLORAN system 20 includes accommodation for a medium GRI (Group Repetition Interval), which corresponds to the time duration of the sequence of pulses, and may include a sequence of timing pulses as master and secondary pulses. It should be understood that in the eLORAN system 20 of FIG. 1, the transmission stations 22 may be configured to transmit the respective plurality of eLORAN signals sequentially based upon an eLORAN GRI. Generally, the group repetition interval corresponds to the specified time interval for all eLORAN transmitter stations 22 of a chain to transmit their pulse groups. For each chain, a minimum group repetition interval is selected of sufficient duration to provide the time for each eLORAN transmitter station 22 to transmit its pulse group and an additional time period between each pulse group so that signals from two or more transmitter stations do not overlap in time within the coverage area. The group repetition interval is normally calculated in units of tens of microseconds and given a whole number designation as a standard. For example, the group repetition interval having 69,950 microseconds corresponds to the GRI referred to as "6995," which, for a certain application of the LDC can produce 143 messages over two minutes. This eLORAN data channel has a low data rate usually of about 50 to 100 bits per second, depending on GRI value, and provides these multiple messages to a user operating an eLORAN receiver device 34 to support the accuracy, integrity and availability requirements in the eLORAN system 20.

A user operating one or more eLORAN receiver devices 34 may apply the additional secondary factors from the map to improve positioning accuracy. As noted before, the eLORAN system 20 signal structure is between a 90 and 110 KHz frequency band and with a pulse signal usually at about a 100 KHz carrier frequency. The eLORAN signal usually has groups of eight to ten pulses that are spaced about 1 millisecond in a TDMA structure. The transmission of groups repeats every group repetition interval (GRI). As many as five different eLORAN transmitter stations 22 may share the same group repetition interval to form a chain with a master and secondary transmissions. The eLORAN signal envelope shape identifies a reference of zero-crossing, which is synchronized to the UTC. The transmitted signals may be phase coded 0 or 180° for master/secondary identification and mitigation against multiple hop sky waves.

As a non-limiting example, those skilled in the art will understand that different implementations of the eLORAN data channel may exist, such as a three-state pulse position modulation known as the Eurofix modulation system that is standardized by the RTCM and ITU, a 9th pulse modulation system or a 9th-10th pulse modulation system. The first two modulation systems provide equal data bandwidth of approximately 20 to 50 BPS, while the third provides approximately 100 bps. Modulation systems are protected by Reed-Solomon forward error correcting code to counter the effects of noise. The Eurofix modulation system has a pulse position modulation of pulses 3 . . . 8 by +1, 0, −1 microseconds, while the 9th and 9th-10th pulse modulation systems have the additional 9th or 9th and 10th pulses of 32 possible delay values between 0 and 158.75 microseconds. In the Eurofix modulation system as noted before, the pulses are pulse position modulated (ppm) plus or minus (one) 1 microsecond. There are about 729 possible modulation patterns and the pulse position modulated encoding uses about 128 of a possible 141 balanced patterns to represent 7 bits of data per group repetition interval. The data rate may be about 70 to 175 bits per second based on the group repetition interval and uses the Reed-Solomon forward error correction technique. In an example, the Eurofix message length is fixed at about 210 bits having 37-bit words.

With the 9th pulse modulation system, the pulse is inserted 100 microseconds after the 8th pulse and may use 32-state pulse-position modulation to encode the data at a data rate of about 5 bits per GRI.

In an example, as understood by those skilled in the art, it is possible that the Eurofix modulation system may have 56 bits as a DGPS message. A message may have 14 bits as a cyclic redundancy check for data link integrity, and 140 bits for the Reed-Solomon parity. In addition, 210 bits may correspond to 30 GRI's of 7 bits per message, and thus, correspond to about 1.2 to about 3 seconds per message. The 9th pulse modulation system may have a 32 state pulse position modulation (5 bits/GRI) corresponding to 3 bits phase and 2 bits envelope and phase.

In operation, the eLORAN receiver devices 34 may have a position calculation based on three or more pseudo ranges to three or more eLORAN transmitter stations 22. An eLORAN receiver device 34 will measure the arrival times, which convert to pseudo ranges by multiplication with the signal's propagation velocity. It should be understood that this propagation velocity is not equal to the speed of light in a vacuum, but rather depends on the medium the signals travel in and over, such as in atmosphere, over sea, over land, or over mountains. The calculations take into effect the true range, the primary factor (PF), the secondary factor (SF), and the additional secondary factor (ASF), together with the variation in those factors and any remaining measurement errors. The receiver clock bias (i.e., time error) is automatically determined as part of the position calculation process. As noted before, the primary factor delay accounts for the difference between propagation of the signal in the earth's atmosphere as opposed to in free space and the secondary factor delay accounts for signal propagation over sea water, especially the ocean. The primary factor and secondary factor are known and considered constant and an eLORAN receiver 36 uses a model to calculate these delays as a function of the estimated range from the eLORAN receiver to the eLORAN transmitters 22.

The additional secondary factor (ASF) delay build-up depends on the type of soil and other factors and is the total cumulative delay the signal experiences over sections with different ground conductivity. An ASF map may be provided for an operating area as a grid with a survey of nominal ASF's for each eLORAN transmitter station 22. By not taking the ASF's into account, this could result in positioning errors of several hundred meters to even kilometers. ASF's are published as a map with an ASF grid for each eLORAN transmitter station 22. The use of the plurality of transmit frequencies, on the other hand, allows the eLORAN system 20 to operate without reference stations and provides for the correction factor as explained above.

Figure 6:
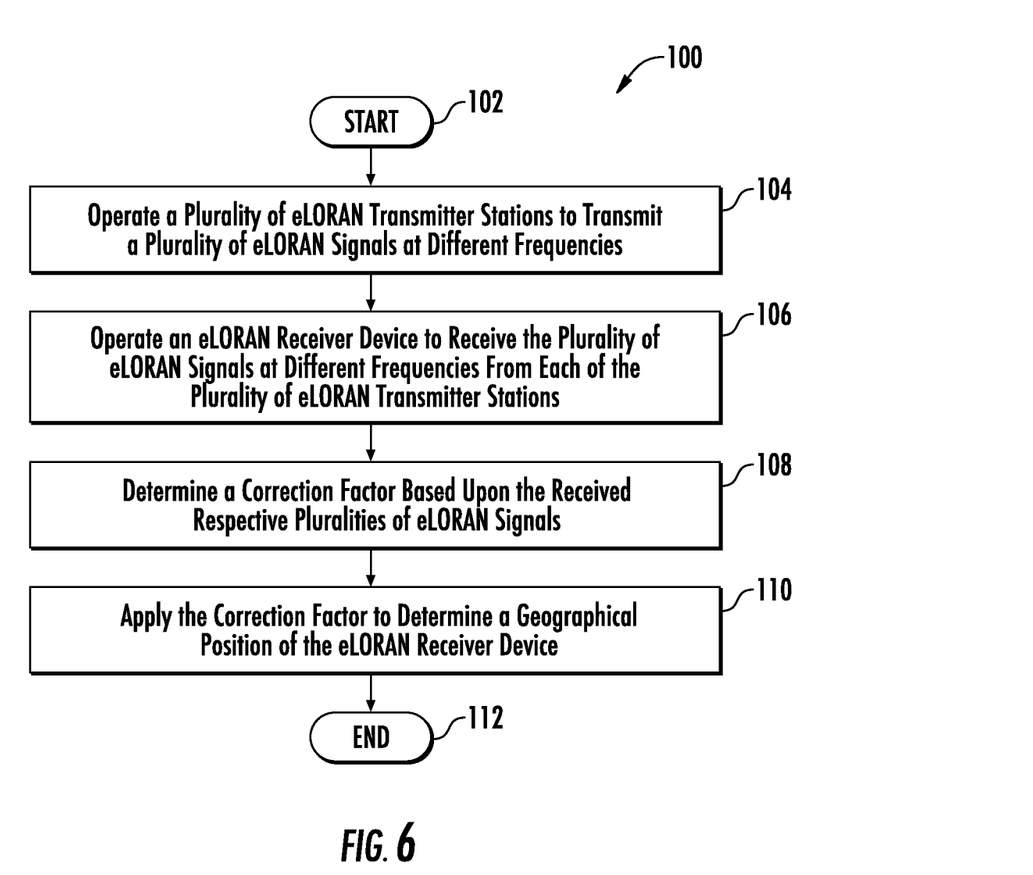
FIG. 6 is a flow diagram illustrating method aspects associated with the eLORAN system in accordance with an example embodiment.

Referring now to FIG. 6, there is illustrated generally at 100 a flow diagram illustrating method aspects associated with eLORAN system 20 in accordance with an example embodiment. The process starts (Block 102) and a plurality of eLORAN transmitter stations 22 operate to transmit a respective plurality of eLORAN signals at different frequencies (Block 104). An eLORAN receiver device 34 is operated to receive the respective plurality of eLORAN signals at different frequencies from each of the plurality of eLORAN transmitter stations (Block 106). A correction factor is determined based upon the received respective pluralities of eLORAN signals at the eLORAN receiver device 34 (Block 108). The correction factor is applied to determine a geographical position of the eLORAN receiver device 34 (Block 110). The process ends (Block 112).

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An enhanced LOng RAnge Navigation (eLORAN) system comprising:
   a plurality of eLORAN transmitter stations, each configured to transmit a respective plurality of eLORAN signals at different frequencies; and
   an eLORAN receiver device configured to receive the respective plurality of eLORAN signals at different frequencies from each of the plurality of eLORAN transmitter stations,
   determine a correction factor based upon a phase delay between the received respective pluralities of eLORAN signals and any diurnal and seasonal changes in surface properties that impact the phase delay between the transmitted eLORAN signals that travel at different frequencies to the eLORAN receiver device, and
   apply the correction factor to determine a geographical position of the eLORAN receiver device; wherein each eLORAN transmitter station is configured to transmit the respective plurality of eLORAN signals sequentially based upon an eLORAN group repetition interval (GRI) wherein the minimum group repetition interval selected is of sufficient duration to provide the time for each eLORAN transmitter station to transmit its pulse group and an additional time period between each pulse group so that signals from two or more transmitter stations do not overlap in time within the coverage area.

2. The eLORAN system of claim 1 wherein each eLORAN transmitter station is configured to transmit the respective plurality of eLORAN signals simultaneously.

3. The eLORAN system of claim 1 wherein each eLORAN transmitter station is configured to transmit the respective plurality of eLORAN signals sequentially.

4. The eLORAN system of claim 1 wherein each respective plurality of eLORAN signals comprises a first eLORAN signal at a first frequency in a range between 90 KHz and 110 KHz, and a second eLORAN signal at a second frequency above 110 KHz.

5. The eLORAN system of claim 4 wherein the second eLORAN signal is in a range of 150 KHz to 350 KHz.

6. The eLORAN system of claim 1 wherein the eLORAN receiver device is configured to further receive additional secondary factor (ASF) data to determine the geographical position of the eLORAN receiver.

7. The eLORAN system of claim 1 wherein the eLORAN receiver device comprises an eLORAN receiver and an eLORAN receiver device controller coupled thereto.

8. The eLORAN system of claim 1 wherein each eLORAN transmitter station comprises an eLORAN transmitter and an eLORAN transmitter station controller coupled thereto.

9. An enhanced LOng RAnge Navigation (eLORAN) receiver device for an eLORAN system including a plurality of eLORAN transmitter stations, each eLORAN transmitter station configured to transmit a respective plurality of eLORAN signals at different frequencies, the eLORAN receiver device comprising:
   an eLORAN receiver and an eLORAN receiver device controller coupled thereto and configured to
      receive the respective plurality of eLORAN signals at different frequencies from each of the plurality of eLORAN transmitter stations,
      determine a correction factor based upon a phase delay between the received respective pluralities of eLORAN signals and any diurnal and seasonal changes in surface properties that impact the phase delay between the transmitted eLORAN signals that travel at different frequencies to the eLORAN receiver device, and
      apply the correction factor to determine a geographical position of the eLORAN receiver device; wherein each eLORAN transmitter station is configured to transmit the respective plurality of eLORAN signals sequentially based upon an eLORAN group repetition interval (GRI) wherein the minimum group repetition interval selected is of sufficient duration to provide the time for each eLORAN transmitter station to transmit its pulse group and an additional time period between each pulse group so that signals from two or more transmitter stations do not overlap in time within the coverage area.

10. The eLORAN receiver device of claim 9 wherein each respective plurality of eLORAN signals comprises a first eLORAN signal at a first frequency in a range between 90 KHz and 110 KHz, and a second eLORAN signal at a second frequency above 110 KHz.

11. The eLORAN receiver device of claim 10 wherein the second eLORAN signal is in a range of 150 KHz to 350 KHz.

12. The eLORAN receiver device of claim 9 wherein the eLORAN receiver device controller is configured to further receive additional secondary factor (ASF) data to determine the geographical position of the eLORAN receiver.

13. An enhanced LOng RAnge Navigation (eLORAN) transmitter device for an eLORAN system comprising an eLORAN receiver device, the eLORAN transmitter device comprising: an eLORAN transmitter and an eLORAN transmitter station controller coupled thereto and configured to transmit a plurality of eLORAN signals at different frequencies so that the eLORAN receiver device receives the plurality of eLORAN signals at different frequencies, determines a correction factor based upon a phase delay between the received plurality of eLORAN signals and any diurnal and seasonal changes in surface properties that impact the phase delay between the transmitted eLORAN signals that travel at different frequencies to the eLORAN receiver device, and applies the correction factor to determine a geographical position of the eLORAN receiver device; wherein each eLORAN transmitter station is configured to transmit the respective plurality of eLORAN signals sequentially based upon an eLORAN group repetition interval (GRI) wherein the minimum group repetition interval selected is of sufficient duration to provide the time for each eLORAN transmitter station to transmit its pulse group and an additional time period between each pulse group so that signals from two or more transmitter stations do not overlap in time within the coverage area.

14. The eLORAN transmitter device of claim 13 wherein the eLORAN transmitter station controller is configured to transmit the plurality of eLORAN signals simultaneously.

15. The eLORAN transmitter device of claim 13 wherein the eLORAN transmitter station controller is configured to transmit the plurality of eLORAN signals sequentially.

16. The eLORAN transmitter device of claim 13 wherein the plurality of eLORAN signals comprises a first eLORAN signal at a first frequency in a range between 90 KHz and 110 KHz, and a second eLORAN signal at a second frequency above 110 KHz.

17. The eLORAN transmitter device of claim 16 wherein the second eLORAN signal is in a range of 150 KHz to 350 KHz.

18. A method for determining a position of an enhanced Long RAnge Navigation (eLORAN) receiver device comprising:
   operating a plurality of eLOBAN transmitter stations to each transmit a respective plurality of eLORAN signals at different frequencies; and
   operating the eLORAN receiver device to
      receive the respective plurality of eLORAN signals at different frequencies from each of the plurality of eLORAN transmitter stations,
      determine a correction factor based upon a phase delay between the received respective pluralities of eLORAN signals and any diurnal and seasonal changes in surface properties that impact the phase delay between the transmitted eLORAN signals that travel at different frequencies to the eLORAN receiver device, and
      apply the correction factor to determine a geographical position of the eLORAN receiver device; wherein each eLORAN transmitter station is configured to transmit the respective plurality of eLORAN signals sequentially based upon an eLORAN group repetition interval (GRI) wherein the minimum group repetition interval selected is of sufficient duration to provide the time for each eLORAN transmitter station to transmit its pulse group and an additional time period between each pulse group so that signals from two or more transmitter stations do not overlap in time within the coverage area.

19. The method of claim 18 wherein operating each eLORAN transmitter station comprises transmitting the respective plurality of eLORAN signals simultaneously.

20. The method of claim 18 wherein operating each eLORAN transmitter station comprises transmitting the respective plurality of eLORAN signals sequentially.

21. The method of claim 18 wherein each respective plurality of eLORAN signals comprises a first eLORAN signal at a first frequency in a range between 90 KHz and 110 KHz, and a second eLORAN signal at a second frequency above 110 KHz.

22. The method of claim 21 wherein the second eLORAN signal is in a range of 150 KHz to 350 KHz.

23. The method of claim 18 wherein operating the eLORAN receiver device comprises further receiving additional secondary factor (ASF) data to determine the geographical position of the eLORAN receiver.

\* \* \* \* \*